(12) United States Patent
Ouellette et al.

(10) Patent No.: US 7,798,763 B2
(45) Date of Patent: Sep. 21, 2010

(54) CONVEYOR SYSTEM APPARATUS FOR STACKING ARRAYED LAYERS OF OBJECTS

(75) Inventors: Joseph F. Ouellette, Glendale, MO (US); Richard J. Ouellette, Glendale, MO (US)

(73) Assignee: Ouellette Machinery Systems, Inc., Fenton, MO (US)

(*) Notice: Subject to any disclaimer, the term of this patent is extended or adjusted under 35 U.S.C. 154(b) by 393 days.

(21) Appl. No.: 11/946,654

(22) Filed: Nov. 28, 2007

(65) Prior Publication Data

US 2008/0124208 A1    May 29, 2008

Related U.S. Application Data

(60) Provisional application No. 60/867,527, filed on Nov. 28, 2006.

(51) Int. Cl.
*B65G 57/30* (2006.01)
*B65G 67/24* (2006.01)
*B65G 57/00* (2006.01)

(52) U.S. Cl. ............ 414/795.2; 414/789.7; 414/789.9; 198/418.4; 198/463.4

(58) Field of Classification Search ............ 198/347.1, 198/418.4, 463.4, 468.2, 468.8, 633, 811; 414/789.7, 789.9, 790.2–790.3, 791, 791.6, 414/792.6, 792.9, 794.9, 795.2–795.3, 799, 414/923–924, 931; 53/152–153, 537, 540
See application file for complete search history.

(56) References Cited

U.S. PATENT DOCUMENTS

| | | | | |
|---|---|---|---|---|
| 3,013,369 A | * | 12/1961 | Wilson et al. | 53/537 |
| 3,387,718 A | * | 6/1968 | Roth et al. | 414/792.9 |
| 3,442,400 A | * | 5/1969 | Roth et al. | 414/789.9 |
| 4,197,046 A | * | 4/1980 | Shank | 414/799 |
| 4,302,140 A | * | 11/1981 | Donnelly et al. | 414/790.3 |
| 5,281,080 A | * | 1/1994 | Dale | 414/788.4 |
| 6,059,519 A | * | 5/2000 | Dutto et al. | 414/791.6 |

* cited by examiner

*Primary Examiner*—Gregory W Adams
(74) *Attorney, Agent, or Firm*—Thompson Coburn LLP; Joseph M. Rolnicki (57) ABSTRACT

A stacking apparatus for a conveyor system raises a two-dimensionally arrayed layer of objects conveyed by the conveyor system and stacks the raised layer of objects on a subsequent layer of objects conveyed by the conveyor system. The apparatus then dispenses the stacked layers of objects from the apparatus, whereby the stacked layers of objects can be received by a palletizer for loading on a pallet in a more time efficient manner.

18 Claims, 9 Drawing Sheets

CONVEYOR SYSTEM APPARATUS FOR STACKING ARRAYED LAYERS OF OBJECTS

This patent application claims the benefit of provisional patent application No. 60/867,527 filed on Nov. 28, 2006.

BACKGROUND OF THE INVENTION (1) Field of the Invention

The present invention is a stacking apparatus for a conveyor system. In particular, the present invention is directed to an apparatus that raises a two dimensionally arrayed layer of objects conveyed on a conveyor and stacks the raised layer of objects on a subsequent layer of objects conveyed by the conveyor. The apparatus then dispenses the stacked layers of objects from the apparatus, whereby the stacked layers of objects can be received by a palletizer for loading on a pallet to improve the time efficiency of the palletizer.

(2) Description of the Related Art

In shipping objects such as small boxes, cans, or plastic bottles, it is cost efficient to stack and secure two dimensionally arrayed layers of the objects on a pallet. This enables a large number of the objects to be easily transported from one location to another by moving the pallet. The objects are arranged in two dimensionally arrayed layers on the pallet, with each layer of objects being separated by a slip sheet positioned between the layers. The slip sheets help maintain the positions of the objects in each layer. The layers of objects and the slip sheets positioned between the layers are secured on the pallet by banding, by being wrapped in shrink wrap, or by other equivalent means.

Conveyor systems are used to transport two dimensionally arrayed layers of objects to a palletizer where each layer of objects is sequentially stacked on a pallet. A slip sheet dispenser is typically positioned along the conveyor system or at the palletizer to position a slip sheet on the layer of objects prior to the layer being loaded on the pallet.

In conveying systems that convey two dimensionally arrayed layers of objects to a palletizer to be loaded on a pallet, the quicker the conveyor system can move the layers of objects to the palletizer to load the pallet, the more time efficient and cost efficient the conveyor system and palletizer can be operated. One of the more time consuming steps in conveying layers of objects to a palletizer to be loaded on a pallet is the sequential stacking of layers of objects on top of each other on the pallet. If the time required in stacking single layers of objects on a pallet can be reduced by even a small fraction, considering the number of layers of objects stacked on a pallet, the time involved in loading a pallet can be appreciably reduced. This can result in a significant reduction in the costs involved in palletizing objects for transportation.

SUMMARY OF THE INVENTION

The present invention is a stacker apparatus that enables two stacked layers of objects to be delivered to a palletizer to improve the time efficiency of the palletizer in loading a pallet. The stacker apparatus of the present invention is designed to be positioned over the conveying surface of a conveyor that conveys two dimensionally arrayed layers of objects to a palletizer to be stacked on a pallet.

The apparatus includes a hold back bar that extends across the conveyor conveying surface at an upstream end of the apparatus. The hold back bar is operable to be selectively lowered to a position where the hold back bar holds back an array of objects conveyed on the conveying surface as the conveying surface continues to move in a downstream direction. The hold back bar is selectively raised to allow a set number of two dimensionally arrayed objects to pass beneath the hold back bar on the conveying surface. When the predetermined number of arrayed objects has passed beneath the hold back bar, sensors along the conveying surface control the hold back bar to move to its lowered positioned over the conveying surface where the hold back bar prevents any additional objects from being conveyed on the conveying surface in the downstream direction to the stacker apparatus.

The stacker apparatus has a lift mechanism positioned on the downstream side of the hold back bar. The lift mechanism engages around a two dimensionally arrayed layer of objects being conveyed by the conveying surface, and then lifts the arrayed layer of objects above the conveying surface. This enables a second, subsequent layer of objects released by the hold back bar to move beneath the raised layer of objects. The lift mechanism then deposits the raised layer of objects on the second, subsequent layer of objects, for further movement of the stacked layers of objects on the conveying surface to a palletizer.

A dead plate or stationary plate extends across the conveyor surface at the downstream end of the apparatus. A stop gate is moved between opened and closed positions at the stationary plate. In the closed position of the stop gate, a plurality of posts project upwardly through openings in the stationary plate. The posts engage and stop the downstream movement of the two dimensionally arrayed layer of objects on the conveying surface beneath the lift mechanism of the apparatus. When the stop gate is moved to its opened position, the plurality of posts are retracted beneath the stationary plate allowing stacked layers of objects to be moved across the stationary plate in the downstream direction from the apparatus.

The lift mechanism includes four panels with four engagement surfaces arranged in a rectangular configuration and a horizontal top plate that is suspended over the rectangular configuration of the four engagement surfaces. The lift mechanism is selectively raised and lowered relative to the conveying surface. In the lowered position of the lift mechanism, the four engagement surfaces surround the two dimensionally arrayed layer of objects conveyed on the conveying surface and stopped by the closed stop gate. The top plate rests on a slip sheet on top of the layer of objects and thereby holds the objects in their relative positions. The four engagement surfaces are controlled to move inwardly toward each other and engage around the layer of objects. The engagement surfaces are then raised, raising the layer of objects above the conveying surface. The layer of objects is raised a sufficient height to allow a second, subsequent layer of objects to be released from the hold back bar and moved in the downstream direction to engage with the closed stop gate beneath the raised layer of objects. The raised layer of objects can then be lowered and stacked by the lift mechanism on the second, subsequent layer of objects. The lift mechanism is then disengaged from the layer of objects stacked on the subsequent layer of objects, and the engagement surfaces of the lift mechanism are moved outwardly away from the stacked layers of objects to allow the stacked objects to move in the downstream direction from the apparatus. The stop gate is opened to allow the stacked layer of objects to move in the downstream direction to a palletizer.

A pair of push rods extend across the conveying surface, and a first one of the pair of push rods engages with the stacked layers of objects on the upstream side of the stacked layers. The one push rod pushes the stacked layers across the stationary plate at the downstream end of the conveying surface to a conveying system of a palletizer where the stacked layers of objects can be loaded onto a pallet in the same time required for single layers of objects to be stacked on a pallet. After the one push bar has pushed the stacked layer of objects out from the apparatus, the movement of the one push bar is stopped as the next layer of objects conveyed by the conveying surface is raised by the lift mechanism, and a subsequent layer of objects is conveyed beneath the lift mechanism by the conveying surface. As the raised layer of objects is stacked on top of the subsequent layer of objects moved beneath the lift mechanism, the push bar drive mechanism moves the second, other push bar downwardly where the other push bar is in position to push the stacked layers of objects out of the apparatus and in the downstream direction toward a palletizer.

The novel design of the object layer stacking apparatus of the invention enables layers of objects to be more quickly palletized by a palletizer employing the apparatus of the invention. In this manner, the apparatus of the invention enables a palletizer to operate in a more time efficient manner than prior art palletizers.

BRIEF DESCRIPTION OF THE DRAWING FIGURES

Further features of the invention are set forth in the following detailed description of the preferred embodiment of the invention and in the drawing figures.

DETAILED DESCRIPTION OF THE PREFERRED EMBODIMENT

Figure 1:
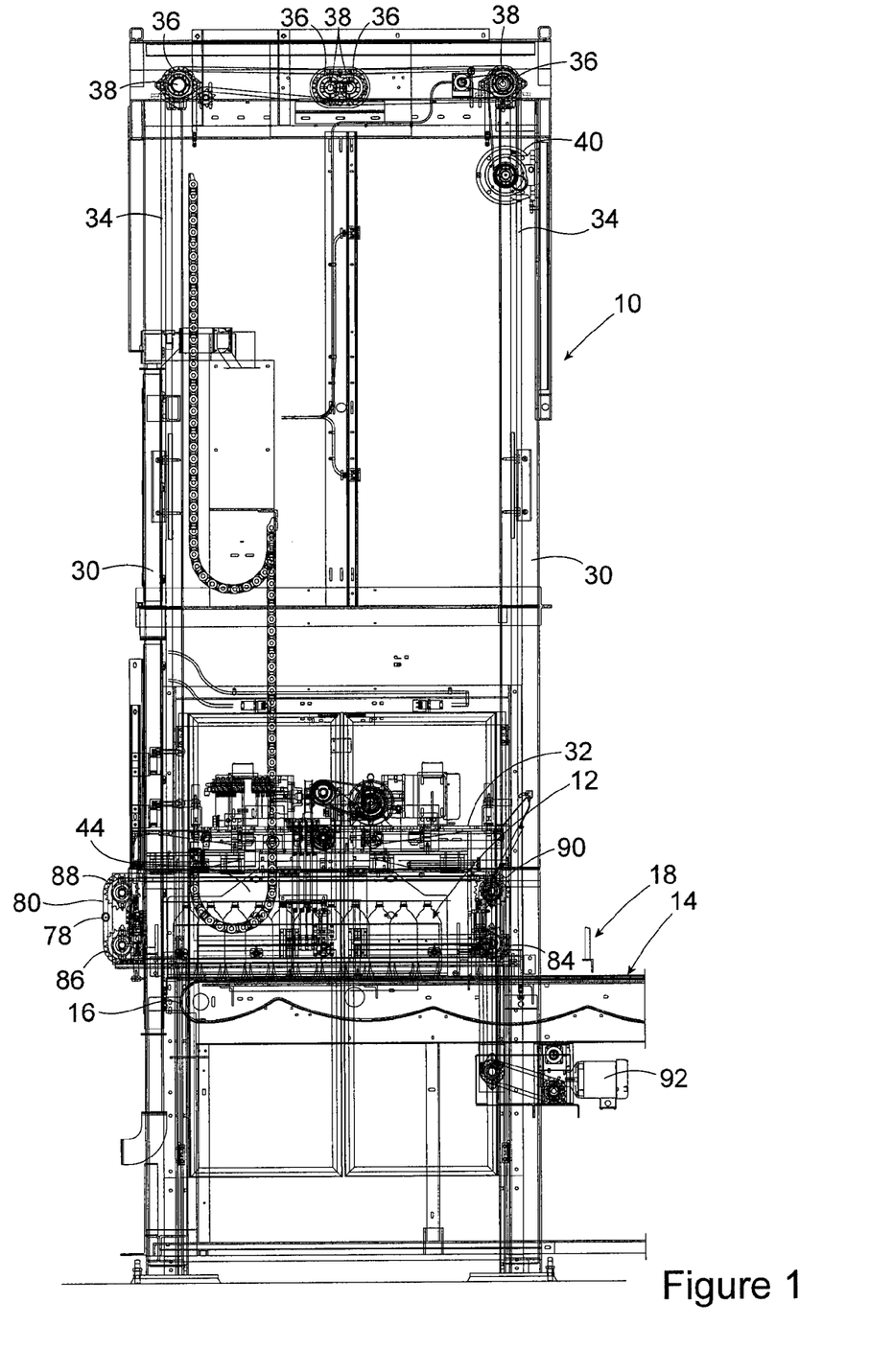
FIG. 1 is a side elevation view of the conveyor system apparatus for stacking arrayed layers of objects. The conveyor system is positioned to convey objects in a downstream direction from right to left as shown in FIG. 1.

FIG. 1 is a side elevation view of the apparatus 10 of the invention that is used in stacking two-dimensionally arrayed layers of objects that are being transported on a conveyor system to a palletizer. As viewed in FIG. 1, the right side of the figure is the upstream end of the apparatus and the left side of the figure is the downstream end of the apparatus. Thus, the conveyor system conveys two-dimensionally arrayed layers of objects in the downstream direction from the right side to the left side of FIG. 1. Generally, the apparatus of the invention receives a two-dimensionally arrayed layer of objects conveyed by the conveyor system, engages and raises that layer of objects above the conveying surface of the conveying system while a second, subsequent two-dimensionally arrayed layer of objects is conveyed beneath the raised layer, and then deposits the raised layer of objects on the subsequent layer of objects. The apparatus then pushes the two stacked layers of objects in the downstream direction from the apparatus where the stacked layers of objects will be conveyed to a palletizer. The ability of the stacking apparatus of the invention to stack layers of objects being transported to a palletizer improves the time efficiency of the palletizer in loading a pallet.

In the description of the apparatus 10 to follow, two-dimensionally arrayed layers of plastic bottles 12 conveyed on a conveying surface 14 of a belt conveyor are the examples of the objects stacked by the apparatus. It should be understood that the apparatus of the invention may be employed in stacking other types of objects.

The conveying surface 14 of the conveyor is preferably a belt-type conveying surface that operates continuously to convey two-dimensionally arrayed layers of objects 12 supported on the conveying surface 14 in the downstream direction to a downstream end 16 of the conveying surface shown in FIG. 1. To simplify the drawings, only the downstream end 16 of the conveyor 14 is shown in FIG. 1. As will be explained, the objects 12 are stacked in two layers and are then pushed from the conveying surface 14 in the downstream direction where they are received by an additional conveying system (not shown) that transports the objects to a palletizer.

A conventional hold back bar 18 is positioned over the conveying surface 14 on the upstream side of the apparatus 10. The hold back bar 18 is shown schematically in FIG. 1 to the right side, or upstream side of the apparatus 10. The hold back bar 18 extends laterally across the longitudinal length of the conveying surface 14. The operation of the hold back bar 18 is conventional. The bar 18 is operable to selectively move between a lowered position over the conveying surface 14, and a raised position above the conveying surface. When in the lowered position, the hold back bar 18 is positioned to hold back a two-dimensional array of objects 12 being conveyed on the conveying surface 14 as the conveying surface continues to move in the downstream direction. When the two-dimensional arrayed layer of objects 12 is to move further downstream, the hold back bar 18 is raised above the conveying surface 14 to allow a set number of the two-dimensionally arrayed objects 12 to be moved by the conveying surface 14 in the downstream direction beneath the hold back bar 18. When the predetermined number of arrayed objects 12 has passed beneath the hold back bar 18, sensors along the conveying surface 14 control the hold back bar 18 to move to its lowered position over the conveying surface 14 where the hold back bar 18 engages against a subsequent two-dimensionally arrayed layer of objects and prevents the subsequent layer of objects from being conveyed on the conveying surface 14 in the downstream direction. Hold back bars 18 and their method of operation are known in the prior art and the hold back bar 18 employed with the apparatus of the invention is shown only schematically in the drawing figures.

Figure 2:
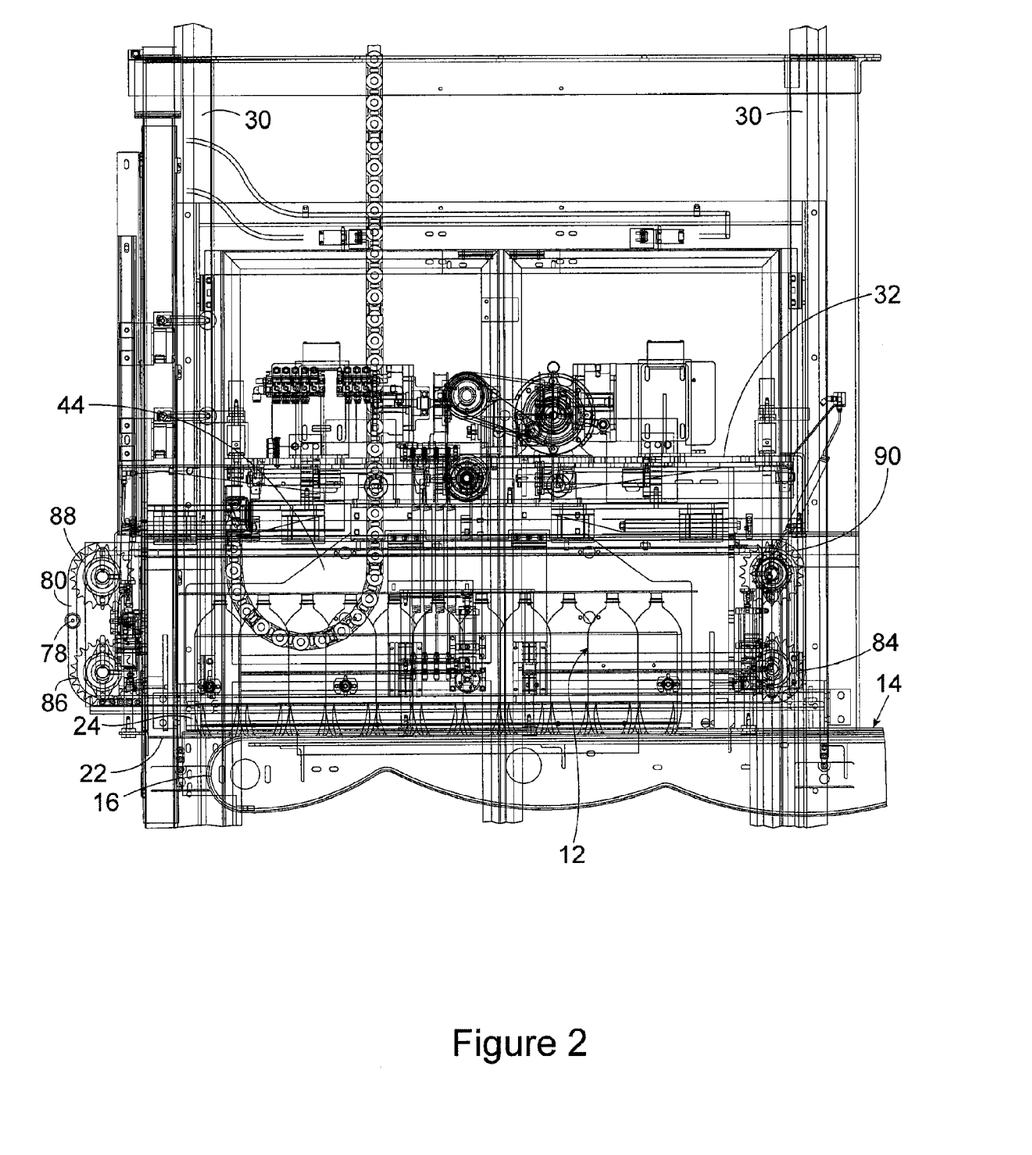
FIG. 2 is an enlarged view of a portion of the apparatus shown in FIG. 1.

The apparatus of the invention includes a horizontal dead plate or a stationary plate 22 (shown in FIG. 2) that extends across the conveyor conveying surface 14 at the downstream end 16 of the conveying surface and on the downstream side of the apparatus 10. The stationary plate 22 is a flat elongate plate that extends laterally across the conveying surface 14 in substantially the same plane as the conveying surface. Thus, the layer of objects 12 conveyed on the conveying surface 14 can be pushed from the conveying surface 14 across the stationary plate 22. The stationary plate 22 has a plurality of openings through the plate. The openings are arranged in a line that extends laterally across the plate 22.

A stop gate is operatively connected to the stationary plate 22. The stop gate is comprised of a plurality of parallel posts 24 that are aligned with the openings in the stationary plate 22. The stop gate is operable to move between opened and closed positions of the posts 24 relative to the plate 22. In the closed position of the stop gate, the plurality of posts 24 are raised and project upwardly through the openings of the stationary plate 22. The raised posts 24 extend laterally across the stationary plate 22 and engage and stop the downstream movement of the two-dimensionally arrayed layer of objects 12 conveyed by the conveying surface 14. The stop gate 24 is positioned to stop the movement of a two-dimensionally arrayed layer of objects 12 directly beneath the apparatus of the invention 10. When the stop gate is moved to its opened position, the plurality of posts 24 are lowered beneath the stationary plate 22. The stacked layer of objects 12 may then be pushed across the stationary plate 22 in the downstream direction from the apparatus.

Figure 3:
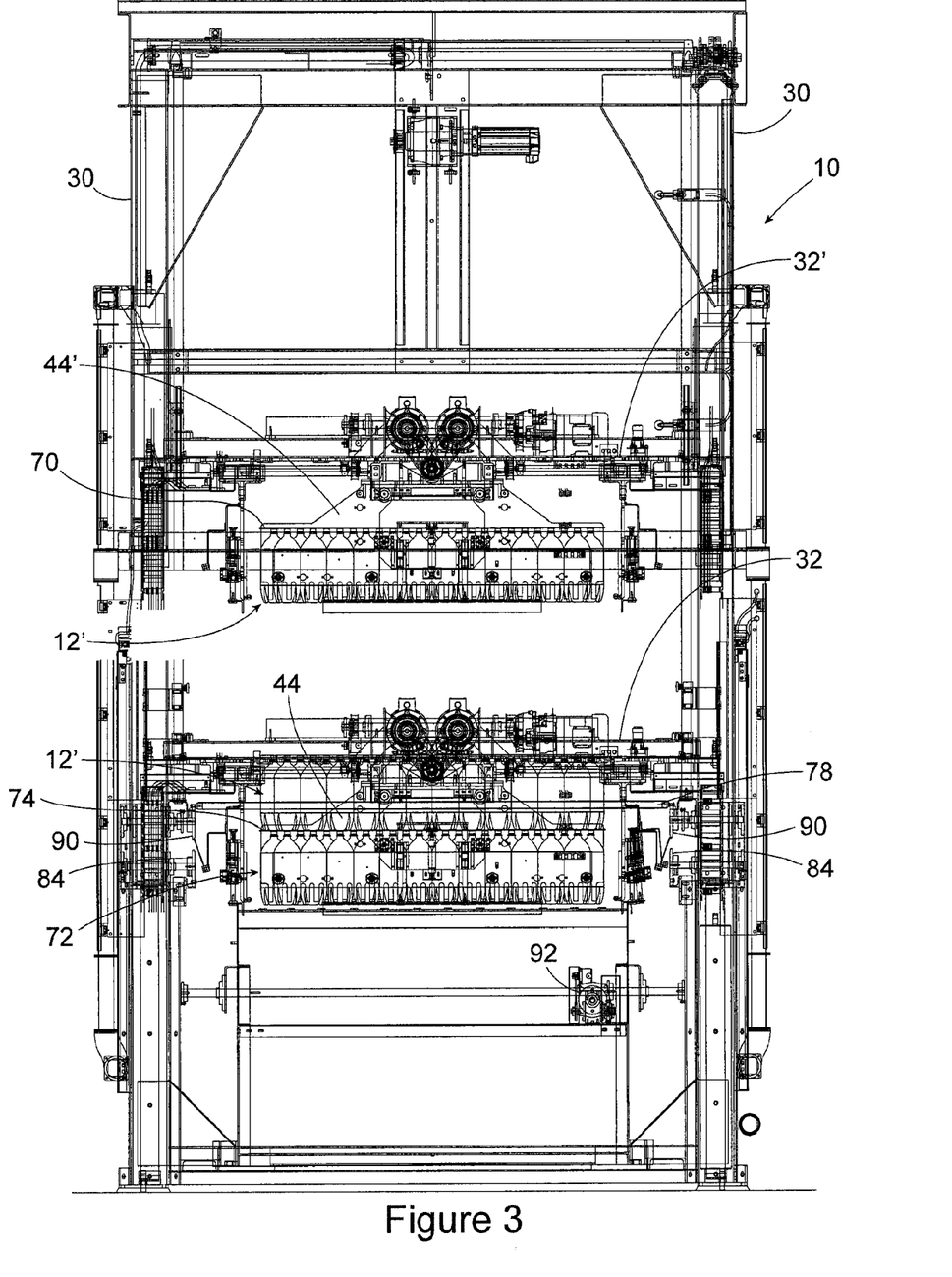
FIG. 3 is an elevation view from the right side of the apparatus shown in FIG. 1, looking in the downstream direction of the conveyor system.
Figure 4:
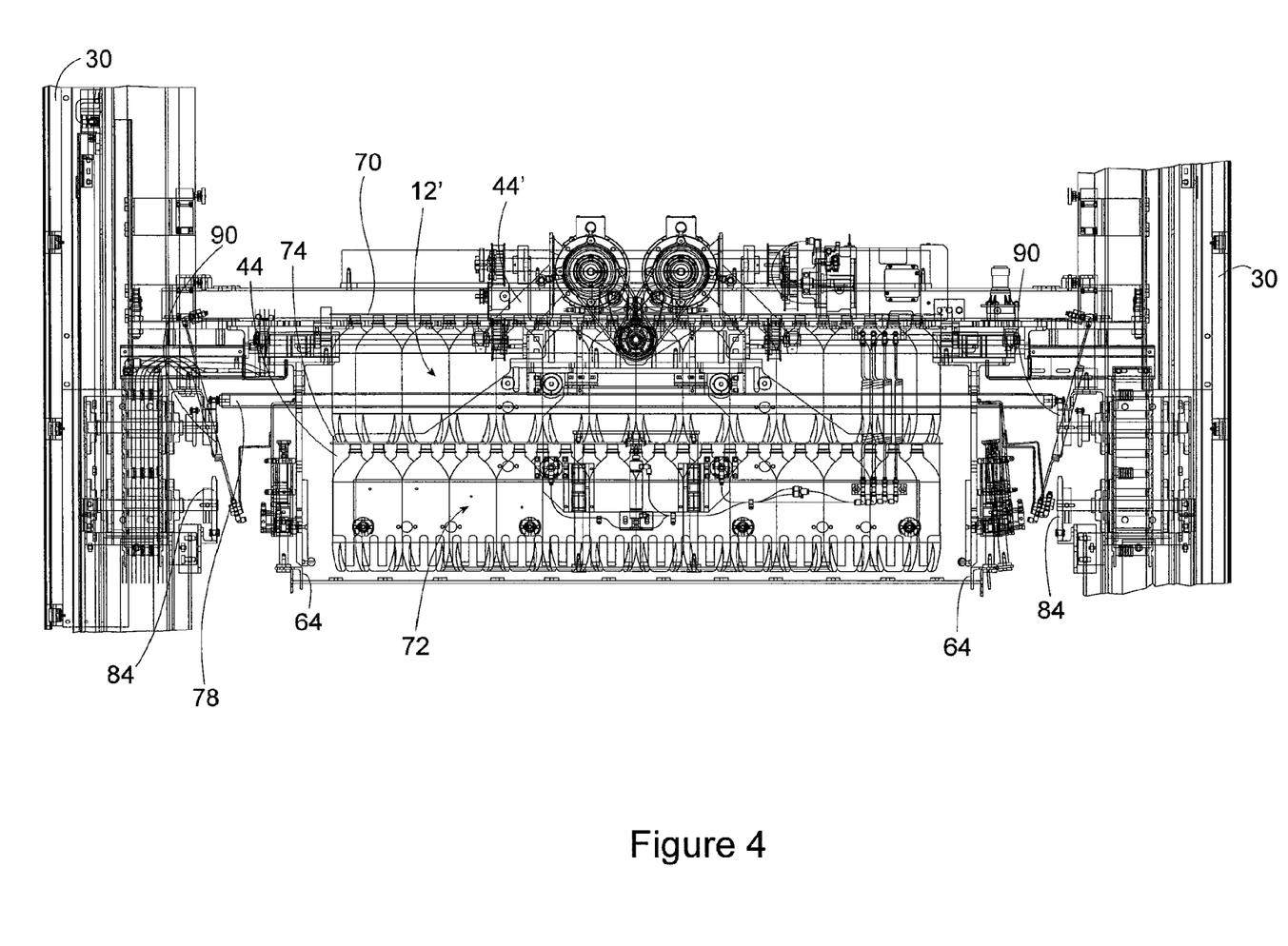
FIG. 4 is an enlarged view of a portion of the apparatus shown in FIG. 3.

The apparatus of the invention includes a supporting frame 30 that extends over the conveying surface 14 of the conveyor system. The frame 30 supports a lift mechanism base 32 that is mounted in the frame 30 for selective upward and downward movements. FIG. 3 shows the lift mechanism in the lowered and raised positions, with the raised position identified by the reference number 32 followed by a prime ('). The lift mechanism base 32 is raised and lowered by a chain drive system comprised of a plurality of lengths of chains 34 and sprockets 36 mounted on shafts 38 above the lift mechanism base 32. Rotation of the shafts 38 in opposite directions is controlled by a motor 40 to selectively raise and lower the lift mechanism base 32 relative to the conveying surface 14.

The lift mechanism base 32 comprises four engagement members 44 (see FIGS. 5-11) that are suspended downwardly beneath the base 32 in a rectangular arrangement. Two of the four engagement members 44 support opposing side panels 46, 48, and two of the four engagement members support opposing front and back panels 50, 52. The engagement members of the side panels 46, 48 are mounted on pairs of rods 54 (see FIG. 7) for sliding movement toward and away from each other. The engagement members 44 of the front and back panels 50, 52 are also mounted on pairs of rods 56 (see FIG. 6) for sliding movement toward and away from each other. The extent of the sliding movement of the panels 46, 48, 50, 52 is determined so that the side panels 46, 48 engage against the opposite sides of a two-dimensionally arrayed layer of objects on the conveying surface 14 when moved toward each other, and so that the front and back panels 50, 52 engage against the front and back of a two-dimensionally arrayed layer of objects supported on the conveying surface 14 when the front and rear panels 50, 52 are moved toward each other. The movement of the panels 46, 48, 50, 52 toward and away from each other can be caused by screw threaded linear actuators, by pneumatic actuators or other equivalent mechanisms.

A projection 58 projects inwardly from the engagement surfaces of the two side panels 46, 48 and the back panel 52. The projection 58 is in the form of an elongate rod that is secured along the bottom edges of the three panels 46, 48, 52. The dimensions of the projecting rod 58 are determined to engage against the curved surfaces at the lower portions of the objects 12 of the array. This enables the engagement surfaces of the panels 46, 48, 50, 52 to engage against the sides of the outer objects 12 in the two-dimensionally arrayed layer of objects, and the projections 58 to engage beneath the undersides of the curved bottoms of the objects 12 to securely hold the two-dimensionally arrayed layer of objects between the pair of side panels 46, 48 and the front 50 and back 52 panels when the panels are moved toward each other.

It should be noted that the front panel 50 does not have a projection 58. In place of the projection 58, the front panel 50 is provided with a plurality of parallel openings 60 (see FIG. 7) along the bottom edge of the panel. Each of the openings 60 is dimensioned to allow passage of one of the stop gate posts 24 through the opening. This enables the front panel 50 to move toward the back panel 52 when the panels engage against the front and back of the two-dimensionally arrayed layer of objects supported on the conveying surface 14 when the stop gate posts 24 are in their raised positions holding the two-dimensionally arrayed layer of objects 12 beneath the apparatus on the conveying surface 14.

Figure 6:
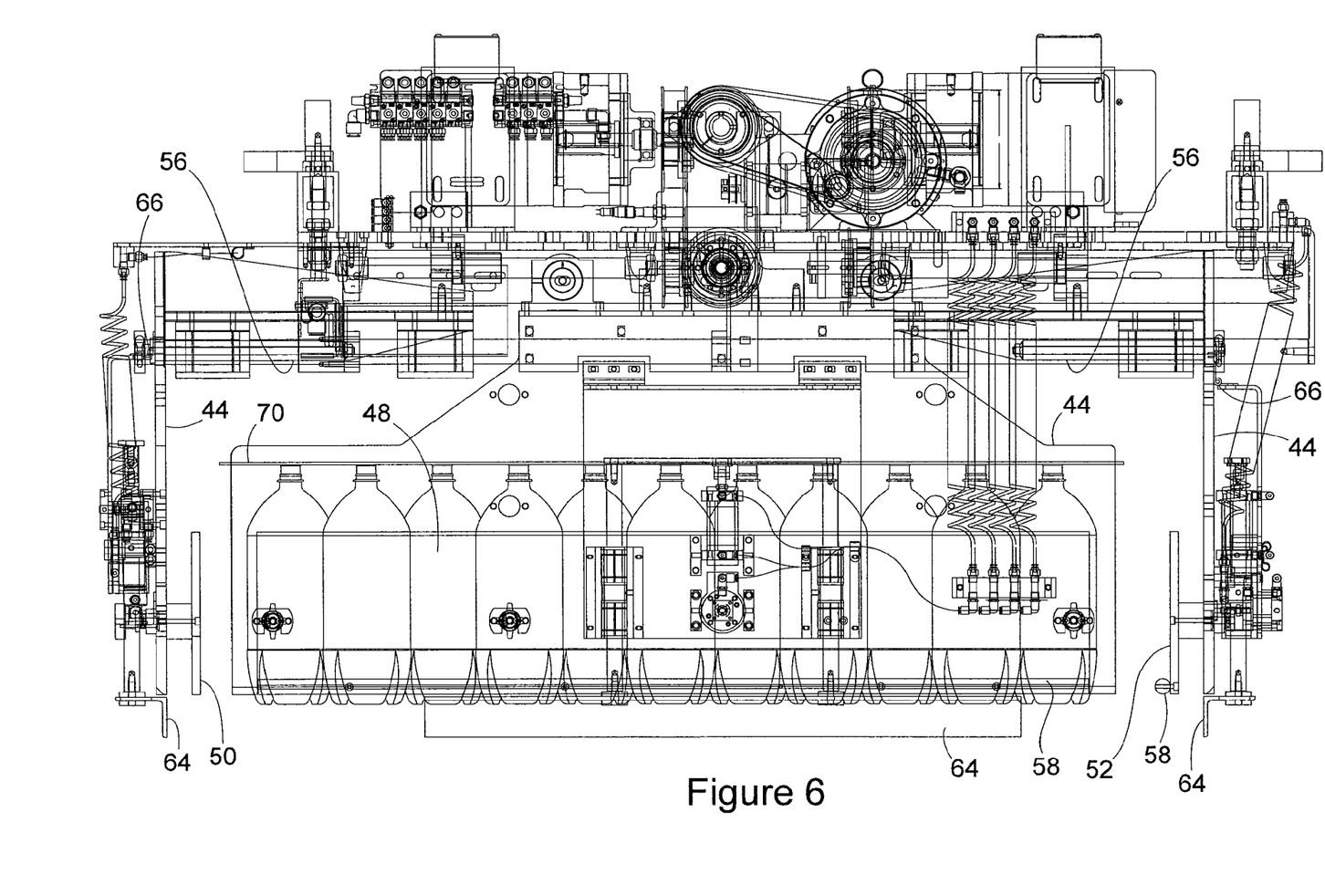
FIG. 6 is an enlarged partial elevation view of the lift mechanism of the apparatus shown in FIG. 1.
Figure 7:
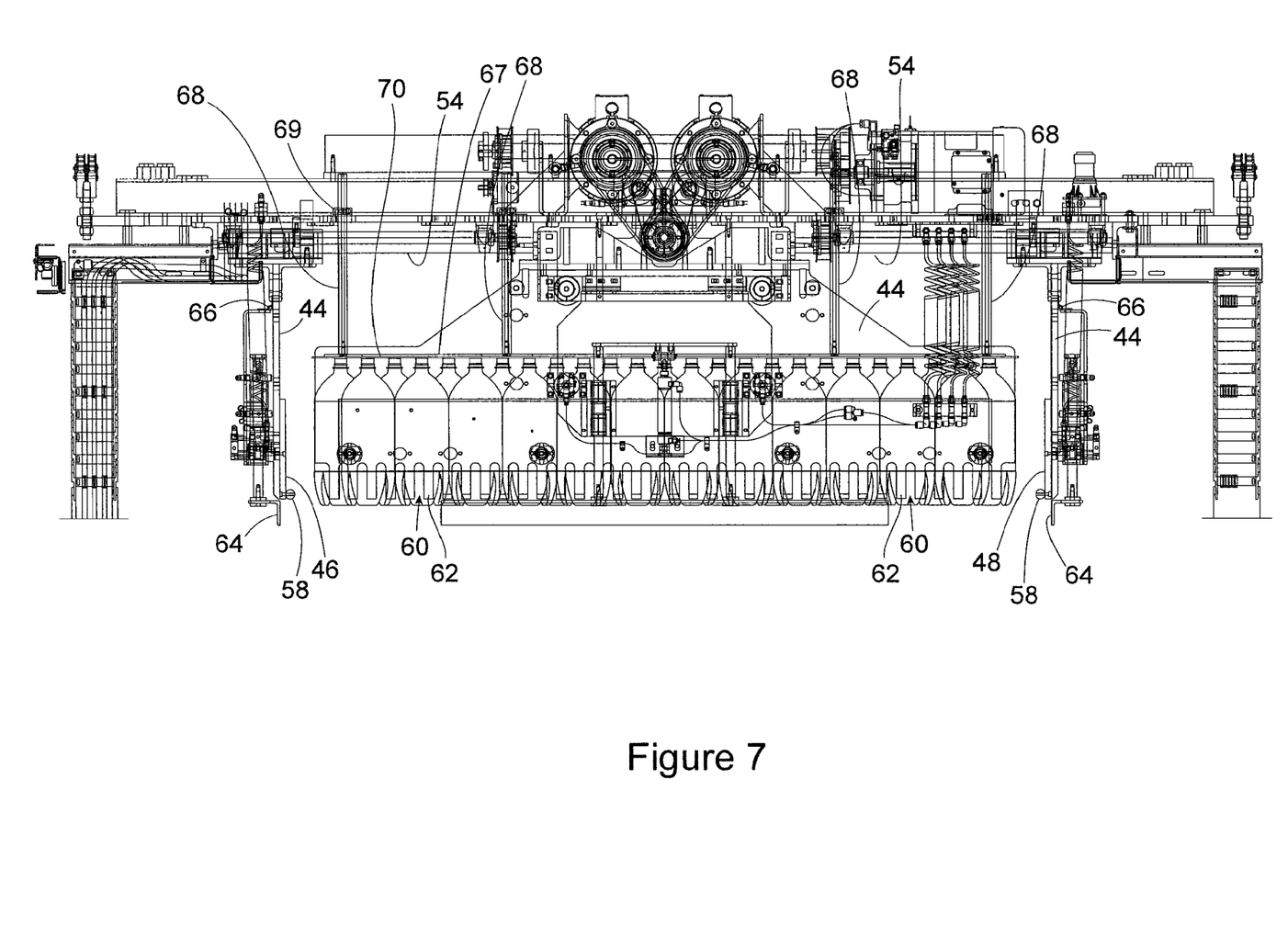
FIG. 7 is an enlarged partial view of the lift mechanism of the apparatus shown in FIG. 3.
Figure 8:
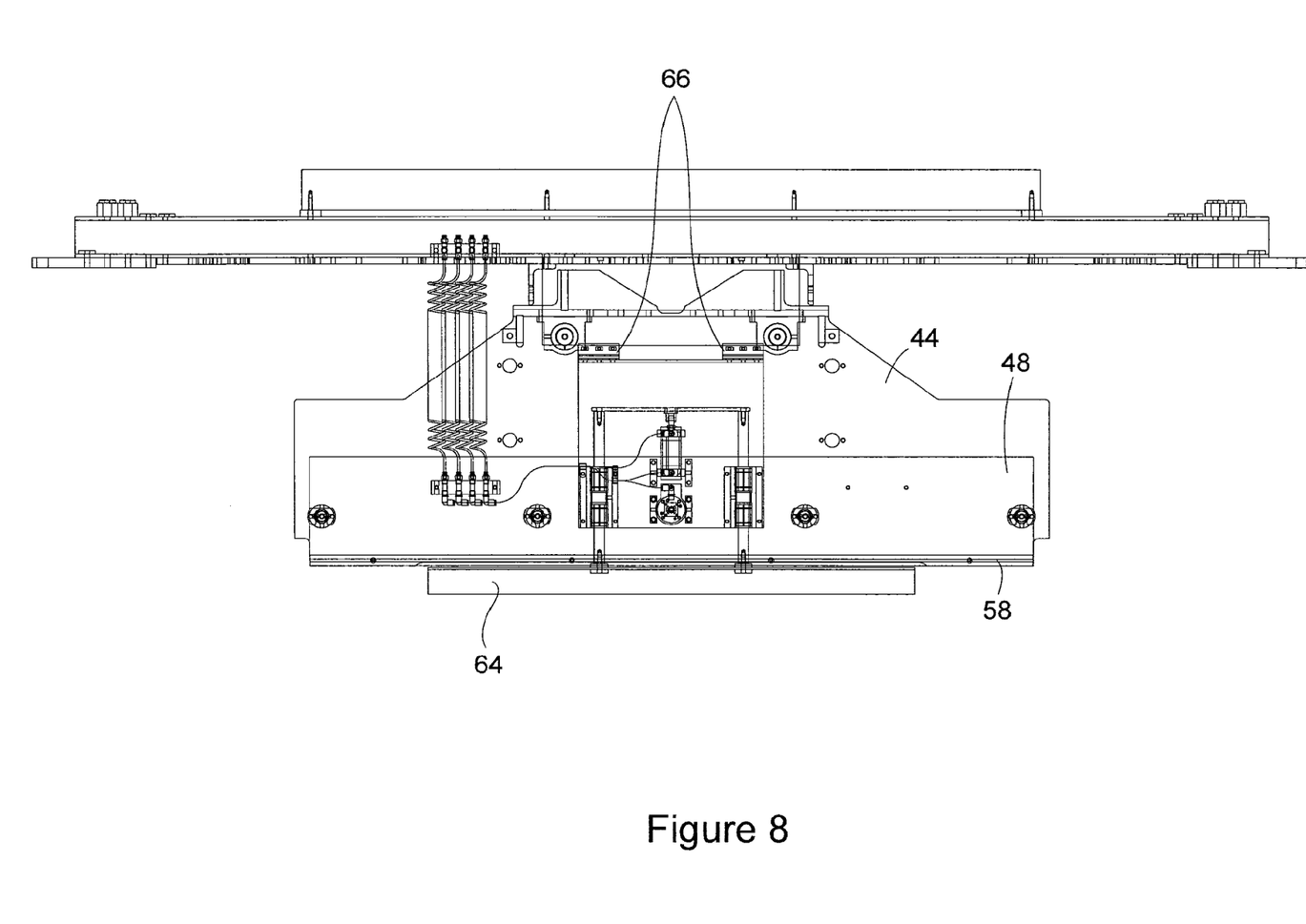
FIG. 8 is an enlarged view of an engagement member of the apparatus.

Each of the four engagement members 44 also has a slip sheet contact surface 64 (see FIGS. 6-11) connected to the engagement member by a pivot connecting assembly 66. The slip sheet contact 64 has an elongate flat surface that extends along a portion of the bottom edge of each panel 46, 48, 50, 52. Each of the slip sheet contact surfaces 64 is positioned to engage against a side edge of the slip sheet supported on the two-dimensionally arrayed layer of objects being conveyed by the conveying surface 14. Each of the slip sheet contacts 64 has an actuator assembly 68 that is selectively operated to pivot the slip sheet contact surface away from the engagement member 44 to which it is attached, and to pivot back into the plane of the engagement member as shown in FIGS. 6 and 7. The slip sheet contacts 64 are moved to the positions shown in FIGS. 6 and 7 when the lift mechanism of the invention is positioning a previously raised layer of objects onto a subsequent layer of objects. The movement of the slip sheet contacts 64 to their positions shown in FIGS. 6 and 7 causes the contacts to engage with the edges of the slip sheet 70 (see FIGS. 3, 4, 6 and 7) on the subsequent layer of objects to properly position the slip sheet when the previously raised layer of objects is being lowered onto the slip sheet of the subsequent layer of objects.

Figure 9:
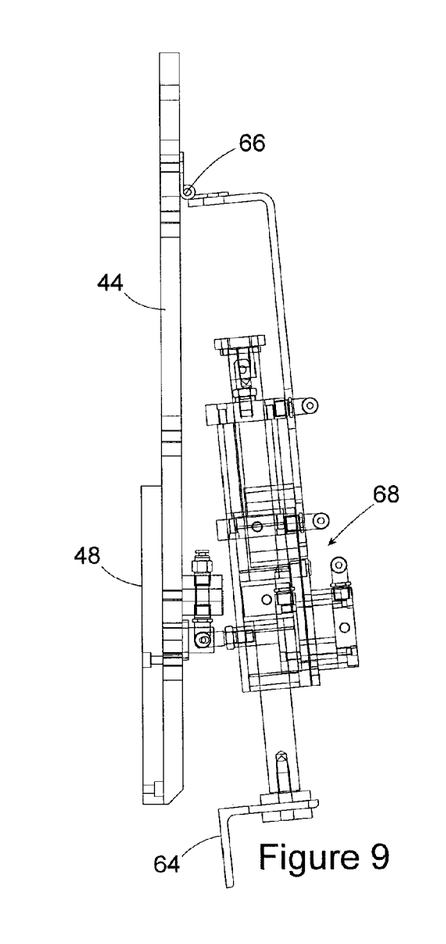
FIGS. 9-11 are enlarged side views of the engagement member shown in FIG. 8.
Figure 10:
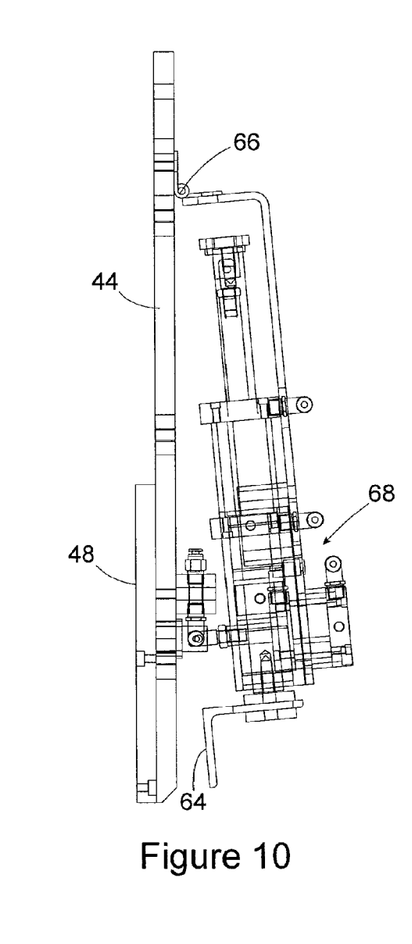
Figure 11:
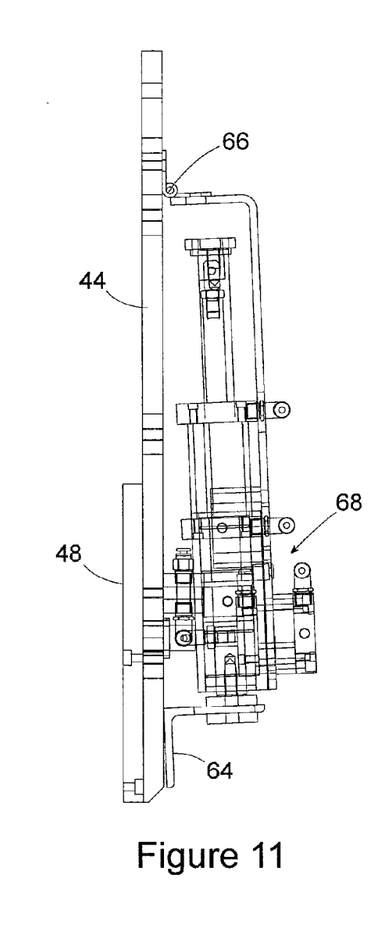

When the lift mechanism panels 46, 48, 50, 52 are lowered toward the conveying surface 14 to engage around a two-dimensionally arrayed layer of objects 12 supported on the conveying surface 14, the slip sheet contacts 64 are moved from their positions shown in FIGS. 6 and 7 to raised positions as shown in FIGS. 9-11. The sequence of movement of the slip sheet contacts 64 by their actuators 68 is shown in FIGS. 9-11. With the slip sheet contacts 64 moved to their raised positions shown in FIG. 11, the side panels 46, 48, 50, 52 of the engagement members 44 can move to a position just above the conveying surface 14 and around the opposite sides of the two-dimensionally arrayed layer of objects 12 to engage the opposite sides of the arrayed layer of objects.

Figure 5:
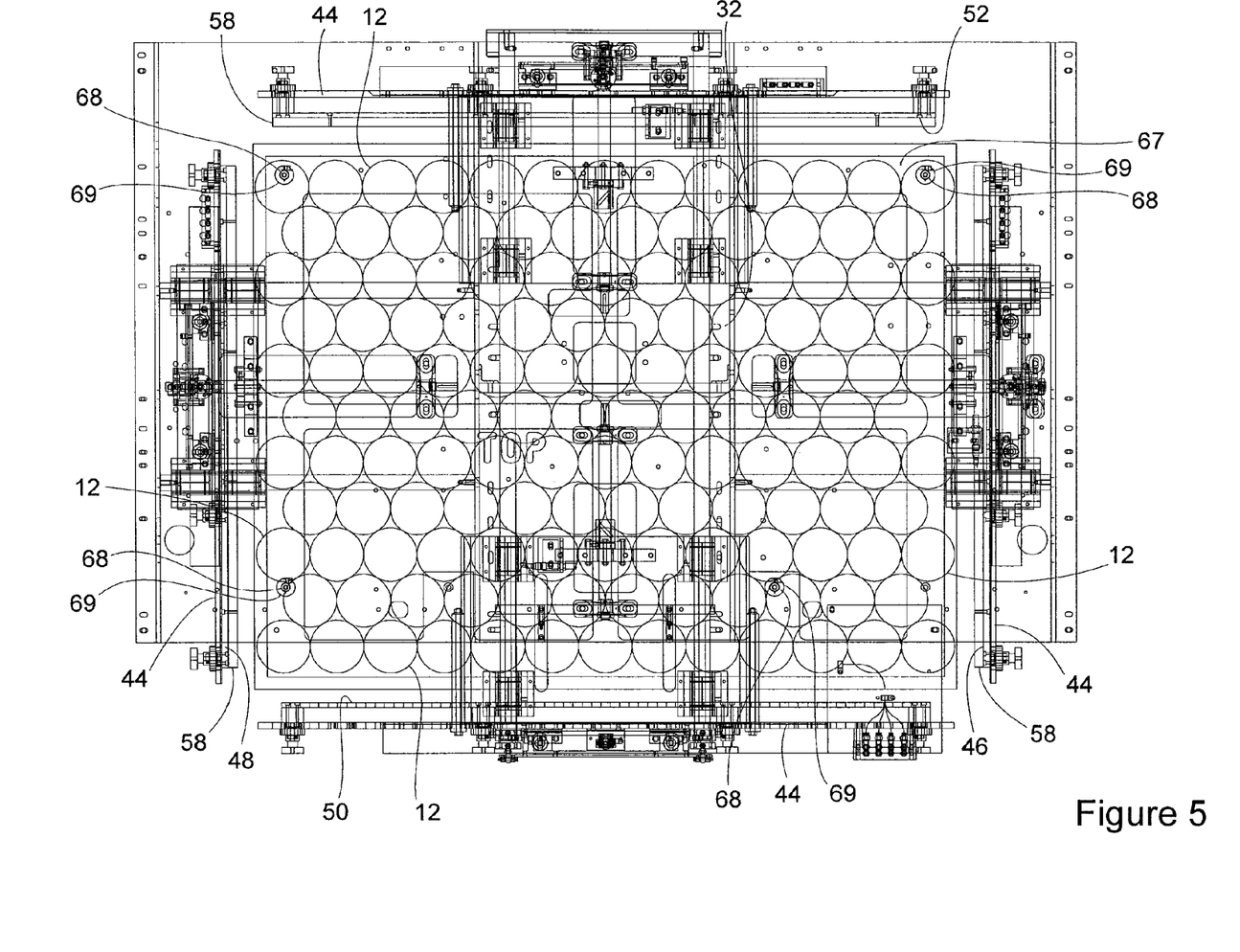
FIG. 5 is a top plan view of a portion of the apparatus shown in FIG. 1.

A positioning plate 67 is suspended below the lift mechanism base 32 by four vertical columns 68. Referring to FIG. 5, the positioning plate 67 has an outer perimeter with a rectangular configuration that is dimensioned to cover over and rest on top of a slip sheet over each of the objects 12 arranged around the perimeter of the two-dimensional layer of objects. The four columns 68 are secured to the top surface of the positioning plate 67 and extend upwardly through bushings 69 or other equivalent sliding connections that suspend the columns 68 and the plate 67 from the lift mechanism base 32. The top ends of the columns 68 are constructed so that they will not pass through the sliding connections 69. Thus, the sliding engagement of the columns 68 in the bushings or sliding connections 69 allow the columns 68 to slide freely upwardly through the sliding connections 69 when the plate 67 engages against the top of a slip sheet on the layer of objects 12. When the lift mechanism base 32 is lowered toward the array of objects 12, the plate 67 engages against the slip sheet over the tops of the objects arranged around the perimeter of the arrayed layer of objects 12 and securely holds these objects in their relative positions as the lift mechanism base 32 is lowered. Thus, the plate 67 securely holds the arrayed layer of objects 12 in their relative positions as the lift mechanism panels 46, 48, 50, 52 are lowered toward the conveying surface 14 to engage around the layer of objects. Because the vertical columns 68 are free to slide through the sliding connection 69, the force of engagement of the positioning plate 67 on the slip sheet on the tops of the objects 12 is provided only by the weight of the plate 67 and the weight of the four columns 68.

In operation of the lift mechanism, with the stop gate posts 24 having held back a two-dimensionally arrayed layer of objects 12 on the conveying surface 14, the lift mechanism base 32 is lowered toward the layer of objects. The pair of side panels 46, 48 and front 50 and rear 52 panels have previously been moved to their retracted positions away from each other. In addition, the slip sheet contacts 64 have previously been raised to their withdrawn positions shown in FIG. 11 behind their respective panels. The lift mechanism base 32 is lowered so that the layer of objects 12 is surrounded on all sides by the side panels 46, 48 and the front and rear panels 50, 52. The positioning plate 67 comes into contact with the slip sheet on the tops of the objects on the conveyor surface 14. The weight of the plate 67 and the columns 68 suspending the plate holds the objects around the perimeter of the layer in their relative positions, and thereby holds all of the objects 12 in their relative positions. The pair of side panels 46, 48 are then moved toward each other into engagement with the opposite sides of the two-dimensionally arrayed layer of objects 12. The front and rear panels 50, 52 are moved toward each other into engagement with the front and rear of the layer of objects. The plurality of front panel openings 60 allow the engagement surface sections 62 of the front panel to move between the raised stop gate posts 24 into engagement with the front of the layer of objects 12. The projections 58 along the bottom edges of the side panels 46, 48 and rear panel 52 come into engagement with the curved surfaces at the bottoms of the objects 12 in the layer. With the layer of objects securely held between the side panels 46, 48 and the front and rear panels 50, 52, the lift mechanism base 32 is raised, raising the layer of objects from the conveying surface 14. The lift mechanism base 32 is raised a sufficient distance to allow ample clearance beneath the raised layer of objects 12 for the next subsequent layer of objects 72 conveyed on the conveying surface 14.

The next subsequent layer of objects 72 is released by the hold back bar 16 and conveyed by the conveying surface 14 into engagement with the stop gate posts 24 where the subsequent layer of objects 72 is positioned directly beneath the raised layer of objects 12. With the subsequent layer of objects 72 held in this position below the raised layer of objects 12, the lift mechanism base 32 is lowered so that the raised layer of objects is spaced a short distance above the slip sheet of the subsequent layer of objects 72. The slip sheet contacts 64 are then moved downwardly to positions adjacent the four edges of the slip sheet on the subsequent layer of objects 72, and are then moved inwardly to square up the slip sheet on the subsequent layer of objects 72. When the slip sheet on the subsequent layer of objects 72 has been squared relative to that layer of objects, the slip sheet contacts 64 are then retracted away from the four edges of the slip sheet. The raised layer of objects 12 is then lowered onto the slip sheet of the subsequent layer of objects 72. The weight of the positioning plate 67 and the four columns 68 on the slip sheet of the stacked layer of objects 12, 72 tends to flatten the slip sheet on the upper layer of objects 12, and also tend to flatten the slip sheet of the lower, subsequent layer of objects 72. The weight of the plate 67 and the columns 68 on the stacked layers of objects compacts the slip sheets and the stacked layers of objects and brings the slip sheets into contact, as much as possible, with the objects arranged below the slip sheets. With the previously raised layer of objects 12 having been positioned on the slip sheet 74 of the subsequent layer of objects 72, the engagement member panels 46, 48, 50, 52 are moved away from the sides of the layer of objects 12 and are raised away from the layer of objects. As the lift mechanism base 32 is raised away from the stacked layers of objects, the positioning plate 67 remains in engagement with the slip sheet on the top layer of objects and thereby maintains the top layer of objects in their relative positions as the engagement member panels 46, 48, 50, 52 are moved away from the layer of objects. The positioning plate columns 68 slide through their sliding connections 69 on the lift mechanism base 32 until the top ends of the columns prevent further sliding movement through the sliding connections 69. The lift plate 67 is then lifted away from the top layer of objects as the lift mechanism base 32 is raised. The stop gate posts 24 are moved to their lowered positions to allow the stacked layers of objects 12, 72 to be conveyed by the conveying surface 14 from the lift mechanism frame 30. The conveying surface 14 conveys the stacked layers of objects 12, 72 in the downstream direction across the stationary plate 22.

Because the stationary plate 22 does not move, the conveying surface 14 cannot push the stacked layers of objects 12, 72 entirely across the plate 22. For this purpose, the apparatus of the invention is provided with a rake bar 78. The rake bar 78 extends laterally across the conveying surface 14 and has opposite ends that are connected to a pair of chain drives 80. The two chain drives 80 are loops of chain positioned along the laterally opposite sides of the conveying surface 14 and h loop of chain 80 is looped around four sprockets. The four sprockets are positioned on the opposite lateral sides of the conveying surface 14 and include a lower upstream sprocket 84, a lower downstream sprocket 86, an upper downstream sprocket 88, and an upper upstream sprocket 90. The four sprockets 84, 86, 88, 90 on the opposite sides of the conveying surface 14 are driven by a motor 92 to cause the rake bar 78 to move adjacent the conveying surface 14 in the downstream direction from the lower upstream sprocket 84 to the lower downstream sprocket 86, then move upwardly from the lower downstream sprocket 86 to the upper downstream sprocket 88, and then move in the upstream direction from the upper downstream sprocket 88 to the upper upstream sprocket 90, and then move downwardly from the upper upstream sprocket 90 to the lower upstream sprocket 84. As the rake bar 78 is moved across the conveying surface 14 in the downstream direction from the lower upstream sprocket 84 to the lower downstream sprocket 86, the rake bar 78 comes into engagement with the stacked layers of objects 12, 72 and pushes the stacked layers of objects in the downstream direction across the stationary plate 22. To accomplish this, the rake bar 78 moves in the downstream direction entirely across the stationary plate 22. This enables the rake bar 78 to push the stacked layers of objects onto a further downstream conveyor on the opposite side of the stationary plate 22 from the apparatus 10 where the further downstream conveyor can convey the stacked layers of objects to a palletizer.

Once the stacked layers of objects 12, 72 have been pushed from the apparatus by the rake bar 78, another layer of objects 12 can be conveyed by the conveying surface 14 into the apparatus. The rake bar 78 remains at its downstream position shown in FIGS. 1 and 2 as this subsequent layer of objects 12 is positioned in the apparatus. The lift mechanism then lowers, engages around the subsequent layer of objects 12 and raises this subsequent layer of objects above the conveying surface 14. The next, subsequent layer of objects can then be conveyed by the conveying surface 14 into the apparatus. As this subsequent layer of objects is moved into the apparatus, the rake bar 78 is caused to move around the upper downstream sprocket 88 and then in an upstream direction over the subsequent layer of objects 72 to the upper, upstream sprocket 90. When the lift mechanism begins to lower the raised layer of objects 12 to position the raised layer of objects on the subsequent layer of objects 72, the rake bar 78 is then caused to move from the upper upstream sprocket 90 around the lower upstream sprocket 84 to a position just upstream from the subsequent layer of objects 72 where the rake bar 78 is again ready to push the stacked layers of objects 12, 72 out of the apparatus.

Although the apparatus of the invention has been described above by reference to a specific embodiment, it should be understood that modifications and variations could be made to the apparatus without departing from the intended scope of the following claims.

What is claimed is:

1. A conveyor system, object stacking apparatus comprising:
   a conveying surface having a length with an upstream end and an opposite downstream end, the conveying surface being operable to support a two dimensionally arrayed layer of objects on the conveying surface as the objects are moved in a downstream direction from the conveying surface upstream end toward the conveying surface downstream end;
   a lift mechanism positioned above the conveying surface, the lift mechanism having a plurality of engagement surfaces that are movable vertically between a lowered position of the lift mechanism relative to the conveying surface where the lift mechanism engagement surfaces are positioned to engage around the two dimensionally arrayed layer of objects supported on the conveying surface, and a raised position of the lift mechanism relative to the conveying surface where the lift mechanism engagement surfaces and the layer of objects engaged by the engagement surfaces are raised to a height above the conveying surface that is larger than a height of a subsequent, two dimensionally arrayed layer of objects supported on the conveying surface, whereby the subsequent layer of objects on the conveying surface can move in the downstream direction on the conveying surface to a position beneath the raised layer of objects engaged by the lift mechanism engagement surfaces and the raised layer of objects can be stacked on the subsequent layer of objects by the lift mechanism engagement surfaces disengaging from around the raised layer of objects;
   a bar that extends across the conveying surface, the bar being movable in the downstream direction to engage with and push the layer of objects stacked on the subsequent layer of objects in the downstream direction and out from beneath the lift mechanism;
   the bar being movable in the downstream direction a distance that causes the bar to push the layer of objects stacked on the subsequent layer of objects in the downstream direction past the conveying surface downstream end;
   a stationary panel extending across the conveying surface adjacent the downstream end of the conveying surface;
   the bar is movable in the downstream direction a distance that causes the bar to push the layer of objects stacked on the subsequent layer of objects in the downstream direction off of the conveying surface and across the stationary panel;
   the stationary panel having at least one opening; and,
   a stop gate is mounted to the stationary panel for vertical movement between a closed position where the stop gate projects upwardly from the stationary panel and an opened position where the stop gate does not project upwardly from the panel.

2. The apparatus of claim 1, further comprising:
   the opening in the stationary panel being one of a plurality of openings in the stationary panel; and,
   the stop gate including a plurality of posts that are aligned with the plurality of openings in the stationary panel and project upwardly through the plurality of openings when the stop gate is in the closed position, and do not project upwardly through the plurality of openings when the stop gate is in the closed position.

3. The apparatus of claim 2, further comprising:
   the lift mechanism having an engagement surface with a plurality of lower surface sections with openings between the lower surface sections, the openings being dimensioned to allow the plurality of stop gate posts to pass through the openings allowing the engagement surface lower sections to pass between the plurality of stop gate posts when the lift mechanism is in the lowered position.

4. A conveyor system, object stacking apparatus comprising:
   a conveying surface having a length with an upstream end and an opposite downstream end, the conveying surface being operable to support a two dimensionally arrayed layer of objects on the conveying surface as the objects are moved in a downstream direction from the conveying surface upstream end toward the conveying surface downstream end;
   a lift mechanism positioned above the conveying surface, the lift mechanism having a plurality of engagement surfaces that are movable vertically between a lowered position of the lift mechanism relative to the conveying surface where the lift mechanism engagement surfaces are positioned to engage around the two dimensionally arrayed layer of objects supported on the conveying surface, and a raised position of the lift mechanism relative to the conveying surface where the lift mechanism engagement surfaces and the layer of objects engaged by the engagement surfaces are raised to a height above the conveying surface that is larger than a height of a subsequent, two dimensionally arrayed layer of objects supported on the conveying surface, whereby the subsequent layer of objects on the conveying surface can move in the downstream direction on the conveying surface to a position beneath the raised layer of objects engaged by the lift mechanism engagement surfaces and the raised layer of objects can be stacked on the subsequent layer of objects by the lift mechanism engagement surfaces disengaging from around the raised layer of objects;
   a bar that extends across the conveying surface, the bar being movable in the downstream direction to engage with and push the layer of objects stacked on the subsequent layer of objects in the downstream direction and out from beneath the lift mechanism;
   the bar being operatively connected to a drive mechanism having means for moving the bar in the downstream direction to push the layer of objects stacked on the subsequent layer of objects out from beneath the lift mechanism, then moving the bar upwardly to a height that is larger than the height of the subsequent layer of objects on the conveying surface, then moving the bar in an upstream direction that is opposite the downstream direction, and then moving the bar downwardly to a position adjacent the conveying surface.

5. The apparatus of claim 4, further comprising:
the means for moving the bar in the downstream direction in a straight line, then moving the bar upwardly in a straight line, then moving the bar in the upstream direction in a straight line, and then moving the bar downwardly in a straight line.

6. A conveyor system, object stacking apparatus comprising:
a conveying surface having a length with an upstream end and an opposite downstream end, the conveying surface being operable to support a two dimensionally arrayed layer of objects on the conveying surface as the objects are moved in a downstream direction from the conveying surface upstream end toward the conveying surface downstream end;
a lift mechanism positioned above the conveying surface, the lift mechanism having a plurality of engagement surfaces that are movable vertically between a lowered position of the lift mechanism relative to the conveying surface where the lift mechanism engagement surfaces are positioned to engage around the two dimensionally arrayed layer of objects supported on the conveying surface, and a raised position of the lift mechanism relative to the conveying surface where the lift mechanism engagement surfaces and the layer of objects engaged by the engagement surfaces are raised to a height above the conveying surface that is larger than a height of a subsequent, two dimensionally arrayed layer of objects supported on the conveying surface, whereby the subsequent layer of objects on the conveying surface can move in the downstream direction on the conveying surface to a position beneath the raised layer of objects engaged by the lift mechanism engagement surfaces and the raised layer of objects can be stacked on the subsequent layer of objects by the lift mechanism engagement surfaces disengaging from around the raised layer of objects;
a bar that extends across the conveying surface, the bar being movable in the downstream direction to engage with and push the layer of objects stacked on the subsequent layer of objects in the downstream direction and out from beneath the lift mechanism;
the bar having a straight length with opposite ends at opposite sides of the conveying surface; and,
a drive mechanism connected to the opposite ends of the bar that controls the bar to move in the downstream direction over the conveying surface and beneath the lift mechanism to a downstream side of the lift mechanism, then move upwardly adjacent the downstream side of the lift mechanism, then move in an upstream direction opposite the downstream direction beneath the lift mechanism to an upstream side of the lift mechanism, and then move downwardly to a position adjacent the conveying surface.

7. A conveyor system, object stacking apparatus comprising:
a conveying surface having a length with an upstream end and an opposite downstream end, the conveying surface being operable to support a two dimensionally arrayed layer of objects on the conveying surface as the objects are moved in a downstream direction from the conveying surface upstream end toward the conveying surface downstream end;
a lift mechanism positioned above the conveying surface, the lift mechanism having a plurality of engagement surfaces that are movable vertically between a lowered position of the lift mechanism relative to the conveying surface where the lift mechanism engagement surfaces are positioned to engage around the two dimensionally arrayed layer of objects supported on the conveying surface, and a raised position of the lift mechanism relative to the conveying surface where the lift mechanism engagement surfaces and the layer of objects engaged by the engagement surfaces are raised to a height above the conveying surface that is larger than a height of a subsequent, two dimensionally arrayed layer of objects supported on the conveying surface, whereby the subsequent layer of objects on the conveying surface can move in the downstream direction on the conveying surface to a position beneath the raised layer of objects engaged by the lift mechanism engagement surfaces and the raised layer of objects can be stacked on the subsequent layer of objects by the lift mechanism engagement surfaces disengaging from around the raised layer of objects;
a bar that extends across the conveying surface, the bar being movable in the downstream direction to engage with and push the layer of objects stacked on the subsequent layer of objects in the downstream direction and out from beneath the lift mechanism;
the bar having a length that extends across the conveying surface with opposite ends of the bar being at opposite sides of the conveying surface;
a pair of chain loops operatively connected to the opposite ends of the bar;
a pair of lower upstream sprockets at opposite sides of the conveying surface, each chain loop extending around one of the lower upstream sprockets;
a pair of lower downstream sprockets at oppose sides of the conveying surface and spaced in the downstream direction from the pair of lower upstream sprockets, each chain loop extending around one of the lower downstream sprockets;
a pair of upper downstream sprockets at opposite sides of the conveying surface and spaced upwardly from the pair of lower downstream sprockets, each chain loop extending around one of the upper downstream sprockets; and,
a pair of upper upstream sprockets at opposite sides of the conveying surface and spaced in an upstream direction opposite the downstream direction from the pair of upper downstream sprockets, and spaced upwardly from the pair of lower upstream sprockets, each chain loop extending around one of the pair of upper upstream sprockets;
position, whereby the engaged layer of objects are positionable on the second layer of objects to produced stacked layers of objects on the conveying surface.

8. The apparatus of claim 6, further comprising:
the lift mechanism engagement surfaces include four separate engagement surfaces that are arranged in a rectangular configuration that surrounds the two dimensionally arrayed layer of objects on the conveying surface when the lift mechanism is in the lowered position.

9. A conveyor system, object stacking apparatus comprising:
a conveying surface having a length with an upstream end and an opposite downstream end, the conveying surface being operable to support a two dimensionally arrayed layer of objects on the conveying surface as the objects are moved in a downstream direction from the conveying surface upstream end toward the conveying surface downstream end;

a lift mechanism positioned above the conveying surface, the lift mechanism having a plurality of engagement surfaces that are movable vertically between a lowered position of the lift mechanism relative to the conveying surface where the lift mechanism engagement surfaces are positioned to engage around the two dimensionally arrayed layer of objects supported on the conveying surface, and a raised position of the lift mechanism relative to the conveying surface where the lift mechanism engagement surfaces and the layer of objects engaged by the engagement surfaces are raised to a height above the conveying surface that is larger than a height of a subsequent, two dimensionally arrayed layer of objects supported on the conveying surface, whereby the subsequent layer of objects on the conveying surface can move in the downstream direction on the conveying surface to a position beneath the raised layer of objects engaged by the lift mechanism engagement surfaces and the raised layer of objects can be stacked on the subsequent layer of objects by the lift mechanism engagement surfaces disengaging from around the raised layer of objects;

a bar that extends across the conveying surface, the bar being movable in the downstream direction to engage with and push the layer of objects stacked on the subsequent layer of objects in the downstream direction and out from beneath the lift mechanism;

the lift mechanism engagement surfaces include four separate engagement surfaces that are arranged in a rectangular configuration that surrounds the two dimensionally arrayed layer of objects on the conveying surface when the lift mechanism is in the lowered position;

each lift mechanism engagement surface being a flat surface with opposite top and bottom edges and opposite side edges; and, a projection on each engagement surface, the projection being positioned adjacent the engagement surface bottom edge and projecting outwardly from the engagement surface.

10. The apparatus of claim 9, further comprising:
the projection on each engagement surface being an elongate bar secured to the engagement surface adjacent the engagement surface bottom edge.

11. A conveyor system, object stacking apparatus comprising:

a conveying surface having a length with an upstream end and an opposite downstream end, the conveying surface being operable to support a two dimensionally arrayed layer of objects on the conveying surface as the objects are moved in a downstream direction from the conveying surface upstream end toward the conveying surface downstream end;

a lift mechanism positioned above the conveying surface, the lift mechanism having a plurality of engagement surfaces that are movable vertically between a lowered position of the lift mechanism relative to the conveying surface where the lift mechanism engagement surfaces are positioned to engage around the two dimensionally arrayed layer of objects supported on the conveying surface, and a raised position of the lift mechanism relative to the conveying surface where the lift mechanism engagement surfaces and the layer of objects engaged by the engagement surfaces are raised to a height above the conveying surface that is larger than a height of a subsequent, two dimensionally arrayed layer of objects supported on the conveying surface, whereby the subsequent layer of objects on the conveying surface can move in the downstream direction on the conveying surface to a position beneath the raised layer of objects engaged by the lift mechanism engagement surfaces and the raised layer of objects can be stacked on the subsequent layer of objects by the lift mechanism engagement surfaces disengaging from around the raised layer of objects;

a bar that extends across the conveying surface, the bar being movable in the downstream direction to engage with and push the layer of objects stacked on the subsequent layer of objects in the downstream direction and out from beneath the lift mechanism; and, a positioning plate suspended from the lift mechanism for vertical movement of the positioning plate relative to the lift mechanism, the positioning plate being suspended a distance from the lift mechanism to rest on the layer of objects as the lift mechanism is moved to the lowered position.

12. A conveyor system, object stacking apparatus comprising:

a conveying surface having a length defining a conveying path with opposite upstream and downstream ends, the conveying surface being operable to support a two dimensionally arrayed layer of objects on the conveying surface and to move the conveying surface and the layer of objects in a downstream direction from the upstream end of the conveying surface to the downstream end of the conveying surface;

a hold back bar extending across the conveying surface, the hold back bar being movable between a lowered position where the hold back bar engages the layer of objects and prevents the layer of objects from moving in the downstream direction as the conveying surface moves in the downstream direction, and a raised position where the hold back bar is raised above the layer of objects and allows the layer of objects to move in the downstream direction with the conveying surface moving in the downstream direction;

a stop gate positioned along the conveying path in the downstream direction from the hold back bar, the stop gate being movable between a closed position where the stop gate engages the layer of objects and prevents the layer of objects from moving in the downstream direction as the conveying surface moves in the downstream direction, and an opened positioned where the stop gate disengages the layer of objects and allows the layer of objects to move in the downstream direction;

a lift mechanism positioned above the conveying surface between the hold back bar and the stop gate, the lift mechanism having four engagement surfaces that are movable vertically together between a lowered position of the lift mechanism relative to the conveying surface where the lift mechanism engagement surfaces are positioned adjacent the conveying surface to engage around a layer of objects, and a raised position of the lift mechanism relative to the conveying surface where the lift mechanism engagement surfaces engage around the layer of objects and are positioned at a height above the conveying surface that is larger than a height of the layer of objects to allow a second layer of objects supported on the conveying surface to move with the conveying surface in the downstream direction and into engagement with the stop gate beneath the engaged layer of objects and the lift mechanism in the raised position, whereby the engaged layer of objects are positionable on the second layer of objects to produced stacked layers of objects on the conveying surface;

a bar extending across the conveying surface, the bar being operatively connected to a drive mechanism having means for moving the bar in the downstream direction to push the stacked layers of objects out from beneath the lift mechanism in the downstream direction, then moving the bar upwardly to a height that is larger than a height of the layer of objects on the conveying surface, then moving the bar in an upstream direction that is opposite the downstream direction, and then moving the bar downwardly to a position adjacent the conveying surface.

13. The apparatus of claim 12, further comprising:

the means for moving the bar in the downstream direction in a straight line, then moving the bar upwardly in a straight line, then moving the bar in the upstream direction in a straight line, and then moving the bar downwardly in a straight line.

14. A conveyor system, object stacking apparatus comprising:

a conveying surface having a length defining a conveying path with opposite upstream and downstream ends, the conveying surface being operable to support a two dimensionally arrayed layer of objects on the conveying surface and to move the conveying surface and the layer of objects in a downstream direction from the upstream end of the conveying surface to the downstream end of the conveying surface;

a hold back bar extending across the conveying surface, the hold back bar being movable between a lowered position where the hold back bar engages the layer of objects and prevents the layer of objects from moving in the downstream direction as the conveying surface moves in the downstream direction, and a raised position where the hold back bar is raised above the layer of objects and allows the layer of objects to move in the downstream direction with the conveying surface moving in the downstream direction;

a stop gate positioned along the conveying path in the downstream direction from the hold back bar, the stop gate being movable between a closed position where the stop gate engages the layer of objects and prevents the layer of objects from moving in the downstream direction as the conveying surface moves in the downstream direction, and an opened positioned where the stop gate disengages the layer of objects and allows the layer of objects to move in the downstream direction;

a lift mechanism positioned above the conveying surface between the hold back bar and the stop gate, the lift mechanism having four engagement surfaces that are movable vertically together between a lowered position of the lift mechanism relative to the conveying surface where the lift mechanism engagement surfaces are positioned adjacent the conveying surface to engage around a layer of objects, and a raised position of the lift mechanism relative to the conveying surface where the lift mechanism engagement surfaces engage around the layer of objects and are positioned at a height above the conveying surface that is larger than a height of the layer of objects to allow a second layer of objects supported on the conveying surface to move with the conveying surface in the downstream direction and into engagement with the stop gate beneath the engaged layer of objects and the lift mechanism in the raised position, whereby the engaged layer of objects are positionable on the second layer of objects to produced stacked layers of objects on the conveying surface;

a bar having a length that extends across the conveying surface with opposite ends of the bar being at opposite sides of the conveying surface;

a pair of chain loops operatively connected to the opposite ends of the bar;

a pair of lower upstream sprockets at opposite sides of the conveying surface, each chain loop extending around one of the lower upstream sprockets;

a pair of lower downstream sprockets at oppose sides of the conveying surface and spaced in the downstream direction from the pair of lower upstream sprockets, each chain loop extending around one of the lower downstream sprockets;

a pair of upper downstream sprockets at opposite sides of the conveying surface and spaced upwardly from the pair of lower downstream sprockets, each chain loop extending around one of the upper downstream sprockets; and, a pair of upper upstream sprockets at opposite sides of the conveying surface and spaced in an upstream direction opposite the downstream direction from the pair of upper downstream sprockets, and spaced upwardly from the pair of lower upstream sprockets, each chain loop extending around one of the pair of upper upstream sprockets.

15. A conveyor system, object stacking apparatus comprising:

a conveying surface having a length defining a conveying path with opposite upstream and downstream ends, the conveying surface being operable to support a two dimensionally arrayed layer of objects on the conveying surface and to move the conveying surface and the layer of objects in a downstream direction from the upstream end of the conveying surface to the downstream end of the conveying surface;

a hold back bar extending across the conveying surface, the hold back bar being movable between a lowered position where the hold back bar engages the layer of objects and prevents the layer of objects from moving in the downstream direction as the conveying surface moves in the downstream direction, and a raised position where the hold back bar is raised above the layer of objects and allows the layer of objects to move in the downstream direction with the conveying surface moving in the downstream direction;

a stop gate positioned along the conveying path in the downstream direction from the hold back bar, the stop gate being movable between a closed position where the stop gate engages the layer of objects and prevents the layer of objects from moving in the downstream direction as the conveying surface moves in the downstream direction, and an opened positioned where the stop gate disengages the layer of objects and allows the layer of objects to move in the downstream direction;

a lift mechanism positioned above the conveying surface between the hold back bar and the stop gate, the lift mechanism having four engagement surfaces that are movable vertically together between a lowered position of the lift mechanism relative to the conveying surface where the lift mechanism engagement surfaces are positioned adjacent the conveying surface to engage around a layer of objects, and a raised position of the lift mechanism relative to the conveying surface where the lift mechanism engagement surfaces engage around the layer of objects and are positioned at a height above the conveying surface that is larger than a height of the layer of objects to allow a second layer of objects supported on the conveying surface to move with the conveying surface in the downstream direction and into engagement with the stop gate beneath the engaged layer of objects and the lift mechanism in the raised position, whereby the engaged layer of objects are positionable on the second layer of objects to produced stacked layers of objects on the conveying surface;

a stationary panel positioned in the conveying path extending across the conveying surface downstream end;

a bar extending across the conveying surface, the bar being movable in the downstream direction to engage with and push the stacked layers of objects in the downstream direction and off the conveying surface and across the stationary panel;

the stationary panel having at least one opening; and, a stop gate is mounted to the stationary panel for vertical movement between a closed position where the stop gate projects upwardly from the stationary panel and an opened position where the stop gate does not project upwardly from the panel.

16. The apparatus of claim 15, further comprising:

the opening in the stationary panel being one of a plurality of openings in the stationary panel; and, the stop gate including a plurality of posts that are aligned with the plurality of openings in the stationary panel and project upwardly through the plurality of openings when the stop gate is in the closed position, and do not project from the plurality of openings when the stop gate is in the closed position.

17. The apparatus of claim 16, further comprising:

the lift mechanism having an engagement surface with a plurality of lower surface sections with openings between the lower surface sections, the openings being dimensioned to allow the plurality of stop gate posts to pass through the openings allowing the lower surface sections to pass between the plurality of stop gate posts when the lift mechanism is in the lowered position.

18. A conveyor system, object stacking apparatus comprising:

a conveying surface having a length defining a conveying path with opposite upstream and downstream ends, the conveying surface being operable to support a two dimensionally arrayed layer of objects on the conveying surface and to move the conveying surface and the layer of objects in a downstream direction from the upstream end of the conveying surface to the downstream end of the conveying surface;

a hold back bar extending across the conveying surface, the hold back bar being movable between a lowered position where the hold back bar engages the layer of objects and prevents the layer of objects from moving in the downstream direction as the conveying surface moves in the downstream direction, and a raised position where the hold back bar is raised above the layer of objects and allows the layer of objects to move in the downstream direction with the conveying surface moving in the downstream direction;

a stop gate positioned along the conveying path in the downstream direction from the hold back bar, the stop gate being movable between a closed position where the stop gate engages the layer of objects and prevents the layer of objects from moving in the downstream direction as the conveying surface moves in the downstream direction, and an opened positioned where the stop gate disengages the layer of objects and allows the layer of objects to move in the downstream direction;

a lift mechanism positioned above the conveying surface between the hold back bar and the stop gate, the lift mechanism having four engagement surfaces that are movable vertically together between a lowered position of the lift mechanism relative to the conveying surface where the lift mechanism engagement surfaces are positioned adjacent the conveying surface to engage around a layer of objects, and a raised position of the lift mechanism relative to the conveying surface where the lift mechanism engagement surfaces engage around the layer of objects and are positioned at a height above the conveying surface that is larger than a height of the layer of objects to allow a second layer of objects supported on the conveying surface to move with the conveying surface in the downstream direction and into engagement with the stop gate beneath the engaged layer of objects and the lift mechanism in the raised position, whereby the engaged layer of objects are positionable on the second layer of objects to produced stacked layers of objects on the conveying surface; and, a positioning plate suspended from the lift mechanism for vertical movement of the positioning plate relative to the lift mechanism, the positioning plate being suspended a distance from the lift mechanism to rest on the layer of objects as the lift mechanism is moved to the lowered position.

\* \* \* \* \*